United States Patent
Mizutani et al.

(10) Patent No.: US 9,707,864 B2
(45) Date of Patent: Jul. 18, 2017

(54) SEAT DEVICE OF VEHICLE

(71) Applicant: MAZDA MOTOR CORPORATION, Hiroshima (JP)

(72) Inventors: Syogo Mizutani, Hiroshima (JP); Tomonori Ohtsubo, Hiroshima (JP); Yoshinori Takeuchi, Aki-gun (JP); Masayoshi Horiue, Frankfurt (DE)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/051,014

(22) Filed: Feb. 23, 2016

(65) Prior Publication Data

US 2016/0264022 A1 Sep. 15, 2016

(30) Foreign Application Priority Data

Mar. 10, 2015 (JP) ................. 2015-046775

(51) Int. Cl.
- *B60N 2/00* (2006.01)
- *B60N 2/06* (2006.01)
- *B60N 2/16* (2006.01)
- *B60N 2/02* (2006.01)

(52) U.S. Cl.
CPC ............. *B60N 2/06* (2013.01); *B60N 2/16* (2013.01); *B60N 2002/0208* (2013.01)

(58) Field of Classification Search
CPC .................................. B60N 2/06; B60N 2/16
USPC ................. 296/65.13, 65.14, 65.15
See application file for complete search history.

(56) References Cited

U.S. PATENT DOCUMENTS

| | | | |
|---|---|---|---|
| 5,499,788 A * | 3/1996 | Rees | B60N 2/0717 248/430 |
| 2011/0233967 A1* | 9/2011 | Ohtsubo | B60N 2/067 296/193.07 |
| 2015/0274050 A1* | 10/2015 | Hosbach | B60N 2/62 297/423.26 |

FOREIGN PATENT DOCUMENTS

JP 2009-096423 A 5/2009

* cited by examiner

*Primary Examiner* — Joseph D Pape
(74) *Attorney, Agent, or Firm* — Studebaker & Brackett PC

(57) ABSTRACT

A slide rail is configured to have a specified front-upward slant angle within a range of 9-11 degrees relative to a floor panel such that a seat slides longitudinally with the specified front-upward slant angle and adjustably over a specified longitudinal range along the slide rail, a thigh support portion is provided at a front end portion of a seat cushion so as to swing vertically around its rear portion with an adjustable swing-angle range of 4 degrees or greater, and a seat device of a vehicle does not comprise any other lift mechanism for adjusting a height of the seat than the slide rail having the specified front-upward slant angle.

15 Claims, 5 Drawing Sheets

(Hpt: Hip Point)

SEAT DEVICE OF VEHICLE

BACKGROUND OF THE INVENTION

The present invention relates to a seat device of a vehicle which is preferable for a seat for a driver.

The seat device of the vehicle includes a seat comprising a seat cushion and a seatback which is connected to a rear end portion of the seat cushion so as to swing longitudinally. In the seat device for the driver's seat, in particular, it is required to provide an appropriate driving position for a pedal operation and also ensure fine front visibility regardless of the body size. Accordingly, a lift mechanism for adjusting the height of the seat as a whole is also provided additionally to a seatback swing-angle adjusting mechanism and a seat longitudinal-position adjusting mechanism (slide adjusting mechanism). Japanese Patent Laid-Open Publication No. 2009-96423 proposes a device in which a thigh support portion is provided at a front end portion of the seat cushion. Herein, the thigh support portion is configured to swing (rotate) vertically around its rear portion such that a swing angle of the thigh support portion is adjustable, whereby a passenger's thigh portion can be properly supported by the thigh support portion.

Further, the longitudinal-position adjustable seat is generally provided to slide with a front-upward slant angle (by a slide rail having the front-upward slant angle) such that the height of the seat located at a forward position is slightly greater than that of the seat located a rearward position.

Herein, it is required as the appropriate driving position that a comfortable state can be maintained (a situation where a muscle does not need to produce any particular force during a normal driving state) and also an operational force for pedal operation can be generated sufficiently when needed. More specifically, it is required from a pedal-operation perspective that plural joint angles (such as a hip angle, a knee angle, and an ankle angle) at a lower part of a body below a waist can be within a specified angle range and also, in particular, the thigh portion can be supported properly. Further, it is required in order to ensure (provide) the fine front visibility that a shortest clear-vision distance (the shortest distance from a longitudinal position of eyes of a passenger to a point on a road surface which is visible to the passenger through a windshield) is not too great or not too small.

In the meantime, it may be considered from view points of light weight and the like that the vehicle is not equipped with the above-described lift mechanism (the mechanism to move vertically the seat as a whole) which is large-sized and heavy. In this case, it becomes difficult to compatibly achieve ensuring of the appropriate driving position and ensuring of a proper driving visual field for all passengers from a preset small body-sized passenger and a preset large body-sized passenger.

Herein, in a conventional device, the above-described front-upward slant angle of the longitudinal position adjustment is generally set at 6 degrees or smaller, so that the move (change) amount of the height of the seat is so small that it is difficult to even ensure the fine front visibility for all passengers from the small body-sized passenger to the large body-sized passenger.

SUMMARY OF THE INVENTION

The present invention has been devised in view of the above-described matters, and an object of the present invention is to provide a seat device of a vehicle which can compatibly achieve ensuring (providing) of the appropriate driving position and ensuring (providing) of the fine front visibility regardless of the body size of the passenger, without increasing the weight of the seat.

The present invention is a seat device of a vehicle, comprising a seat comprising a seat cushion and a seatback which is connected to a rear end portion of the seat cushion, and a slide rail provided to attach the seat to a floor panel such that a position of the seat is longitudinally adjustable within a specified longitudinal range, wherein the slide rail is configured to have a specified front-upward slant angle within a range of 9-11 degrees relative to the floor panel such that the seat slides longitudinally with the specified front-upward slant angle and adjustably over the specified longitudinal range along the slide rail, a thigh support portion is provided at a front end portion of the seat cushion so as to swing vertically around a rear portion thereof with an adjustable swing-angle range of 4 degrees or greater, and the seat device of the vehicle does not comprise any other lift mechanism for adjusting a height of the seat than the slide rail having the specified front-upward slant angle.

According to the present invention, while the front-upward slant angle of the longitudinal slide adjustment is larger than that of the conventional device, an appropriate shortest clear-vision distance for all passengers from the small body-sized passenger to the large body-sized passenger can be provided (the fine front visibility for all passengers can be ensured). Further, the appropriate hip angle among the joint angles for the appropriate driving position can be provided for all passengers from the small body-sized passenger to the large body-sized passenger by the longitudinal-position adjustment including the front-upward slant angle and the swing-angle adjustment of the seatback. Meanwhile, since the above-described front-upward slant angle is relatively large, there might easily occur improper situations that when the longitudinal position is selected according to the body size of the passenger, a portion supporting a front end portion of the thigh (near the knee) becomes tight (particularly, this easily happens to the small-sized passenger seated in the seat located at a considerably-forward position when an angle of the seat face of the seat cushion becomes too large), or it becomes loose conversely (particularly, this easily happens to the large-sized passenger seated in the seat located at a considerably-rearward position when the angle of the seat face of the seat cushion becomes too small). According to the present invention, however, the appropriate knee angle and ankle angle among the joint angles for the appropriate driving position can be also provided by the swing-angle adjustment of the thigh support portion. That is, supporting of the front end portion of the passenger's thigh can be properly achieved. And, since the thigh portion can be properly supported by the thigh support portion, selectivity (a selection width) of the longitudinal position where the passenger feels better is widened, so that the appropriate longitudinal position which can correspond to clothes or shoes the passenger wear can be also provided, ensuring the appropriate driving positions according to the body size of the passenger.

Herein, in a case in which no thigh support portion is provided (i.e., in a case in which the angle of the seat face is constant), since the knee angle is uniquely determined by the seat-face angle of the seat, the selectivity of the hip angle and the ankle angle is narrowed, so that it becomes difficult to provide the appropriate driving position. Even if a driver (passenger) happens to have the body size which is suitable for providing the appropriate driving position, the driver's (passenger's) joint angles may be out of the preferable joint-angle range because of the closes or shoes of the driver (passenger). Herein, it is considered that a tilt mechanism to tilt the seat cushion as a whole is provided in place of the thigh support portion having the adjustable swing-angle. In this case, since the whole seat including the seatback is tilted, there are problems that improperly-large position changes, such as a change in the height position of the passenger's eyes, may be caused and the weight of the seat may be increased compared to a case in which there is provided the thigh support portion constituting part of the seat cushion which is configured to adjustably swing.

In an embodiment of the present invention, there is provided an assist spring for operational-force reduction which reduces an operational force of adjusting the position of the seat along the slide rail having the specified front-upward slant angle. According to this embodiment, while the operational force necessary to move the seat forward becomes greater because of the large front-upward slant angle, this operational force can be reduced properly by providing the assist spring.

Herein, it may be preferable that the above-described front-upward slant angle of the slide rail be set substantially at 10 degrees.

Further, it may be preferable that the above-described adjustable swing-angle range of the thigh support portion be set substantially at 5 degrees.

In another embodiment of the present invention, the specified longitudinal range of the seat's adjustable position and the front-upward slant angle of the slide rail are set such that the shortest clear-vision distance of a preset small-sized passenger seated in the seat located at a foremost position is within a preset specified distance range and the shortest clear-vision distance of a preset large-sized passenger seated in the seat located at a rearmost position is within the above-describe preset specified distance range.

Herein, it may be preferable that the above-described present specified distance range of the shortest clear-vision distance be set at 7.0-8.1 m.

Further, it may be preferable that a difference between a largest distance and a smallest distance of the above-described present specified distance range of the shortest clear-vision distance is set at 1.5 m or less. This setting is appropriate in making driver's (passenger's) feelings of a vehicle speed feeling, a vehicle-stop distance, and a safety during a high-speed vehicle traveling be substantially the same (constant) for all drivers (passengers) having different body sizes.

Herein, it may be preferable that the above-described small-sized passenger corresponds to AF05 standard and the above-described large-sized passenger corresponds to AM95 standard. According to this correspondence, the above-described effects can be provided for all passengers from a female who is about 150 cm tall to a male who is about 190 cm.

In another embodiment of the present invention, a steering wheel of the vehicle is not provided with a telescopic mechanism. This embodiment is preferable in reducing the vehicle weight more as well as providing the appropriate driving position. That is, the appropriate driving position for the drivers having the same body size can be provided by slightly changing the longitudinal position of the seat even in a case in which a longitudinal position of the steering wheel is constant (unchangeable), so that the driver can properly position the driver's fingers at a location of the steering wheel.

Other features, aspects, and advantages of the present invention will become apparent from the following description which refers to the accompanying drawings.

DETAILED DESCRIPTION OF THE INVENTION

Figure 1:
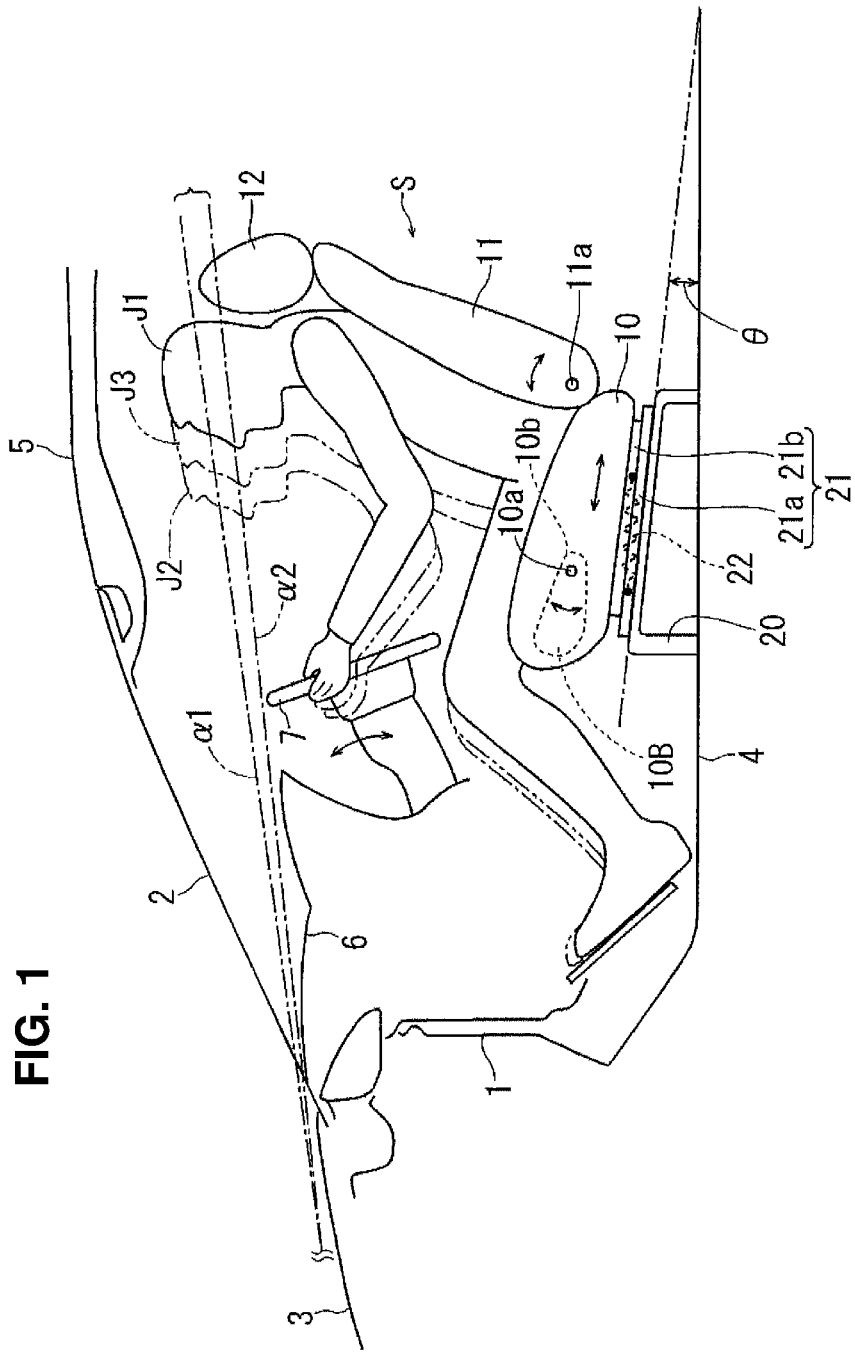
FIG. 1 is a schematic side view showing an embodiment of the present invention.

Hereafter, an embodiment of the present invention will be described referring to the drawings.

In a vehicle V shown in FIG. 1, reference character 1 denotes a dash panel which partitions a vehicle compartment from an engine room, reference character 2 denotes a windshield (front window), reference character 3 denotes an engine hood (bonnet) which covers over the engine room, reference character 4 denotes a floor panel, and reference character 5 denotes a roof panel. Further, reference character 6 denotes an instrument panel and reference character 7 denotes a steering wheel. The steering wheel 7 is equipped with a manual-type tilt mechanism but not with a telescopic mechanism in the present embodiment. Herein, the vehicle V of the present embodiment is a small-sized sports car type of vehicle which may require a light weight, in particular, and installs a manual type of transmission.

In FIG. 1, reference character S denotes a seat for a driver. The seat S comprises a seat cushion 10, a seatback 11, and a headrest 12. The seatback 11 is connected to a rear end portion of the seat cushion 10 via a bracket, not illustrated, so as to longitudinally swing (rotate) around a support point 11a adjustably (in the embodiment, its swing (rotation) angle is manually adjustable).

The seat S is attached to the floor panel 4 by using a base frame 20 and a slide rail 21. That is, the base frame 20 is fixed to the floor panel 4, and a lower rail 21a of the slide rail 21 extending longitudinally is fixed to the base frame 20. Meanwhile, an upper rail 21b which is fixed to the seat cushion 10 engages with the lower rail 21a so as to slide longitudinally.

The slide rail 21 which comprises the lower rail 21a and the upper rail 21b is configured to have a front-upward slant angle θ, which is set substantially at 10 degrees in the embodiment. The seat cushion 10 (i.e., the seat S) is configured such that its position is longitudinally adjustable within a specified length range (260 mm in the embodiment) by using the slide rail 21. In the embodiment, the longitudinal position adjustment is a manual type, and a pitch (unit) of positional adjustability is set at 10 mm, for example. Herein, the seat S is not provided with a lift mechanism (seat lifter) to vertically move the seat cushion 10 and the seatback 11 as a whole.

FIG. 1 illustrates passengers who have different body sizes with reference characters J1, J2 and J3. The passenger J1 illustrated by a solid line represents a preset largest body-sized passenger, who is a passenger corresponding to the AM95 standard in the embodiment (a male who is about 190 cm tall). The passenger J2 illustrated by a one-dotted broken line represents a preset smallest body-sized passenger, who is a passenger corresponding to the AF05 standard in the embodiment (a female who is about 150 cm tall). The passenger J3 illustrated by a two-dotted broken line represents a middle body-sized passenger, who is a passenger corresponding to the AM50 standard (a male who is about 173 cm tall), for example. Hereinafter, the passenger will be simply represented with reference character "J" in a case in which there is no need of differentiating the body sizes of the passengers.

Figure 2:
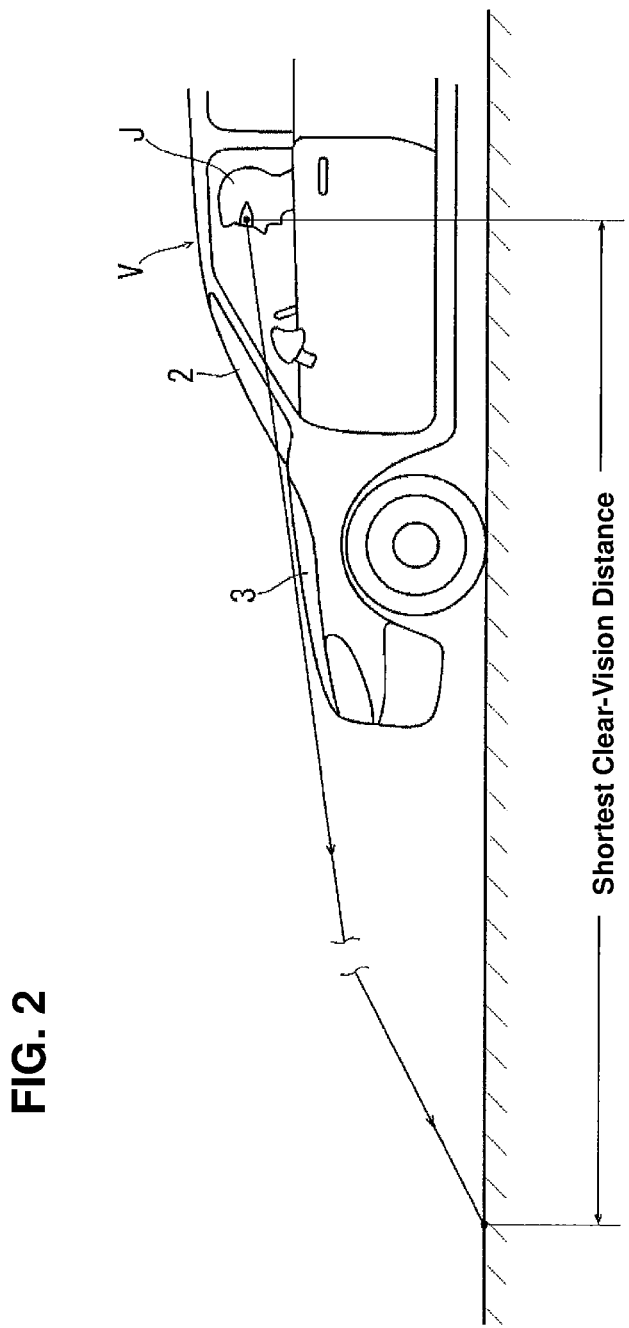
FIG. 2 is a diagram explaining a shortest clear-vision distance.

Herein, a shortest clear-vision distance will be explained referring to FIG. 2. The shortest distance from a longitudinal position of eyes of the passenger J (J1, J2, J3) to a point on a road surface which is visible to the passenger J through the windshield 2 is defined as the shortest clear-vision distance. That is, a vehicle body (a portion near a front end portion of the engine hood, in general) limits the visual field of the passenger, so that the above-described shortest clear-vision distance is determined.

The shortest clear-vision distance greatly influences passenger's feelings of a vehicle speed feeling, a vehicle-stop distance, or a safety during a high-speed vehicle traveling. Therefore, since it is not preferable that the shortest clear-vision distance is extremely small or extremely large, there exists an appropriate distance range for this shortest clear-vision distance. Specifically, the smaller the shortest clear-vision distance is, the better the passenger's feelings of the vehicle speed or the vehicle-stop distance are (8.1 m or smaller is better, for example). Meanwhile, the larger the shortest clear-vision distance is, the better the passenger's feeling of the safety during the high-speed vehicle traveling is (7.0 m or larger is better, for example). Thus, in order to satisfy all three elements of the passenger's feelings of the vehicle speed feeling, the vehicle-stop distance, and the safety during the high-speed vehicle traveling, it is preferable that the shortest clear-vision distance be set within a range of 7.0-8.1 m.

The above-described shortest clear-vision distance can be changed suitably according to the kind of the vehicles. For example, the shortest clear-vision distance can be set at the relatively small one for a family car type (6.2-7.3 m, for example), and set at the relatively large one for a sports car type (7.5-8.6 m, for example). Further, it is preferable that a difference between the largest distance and the smallest distance of the shortest clear-vision distance be set such that the three kinds of passenger's feelings of the vehicle speed feeling, the vehicle-stop distance, and the safety during the high-speed vehicle traveling do not become greatly different from each other depending on the body size of the passenger (driver), for example, set at 1.5 m or less, and preferably at 1.2 m or less.

The above-described front-upward slant angle $\theta$ of the slide rail 21 is set at a specified angle such that the respective shortest clear-vision distances of all passengers (including the passenger J1 and the passenger J2) who have any body size between the largest body size of the passenger J1 and the smallest body size of the passenger J2 are within a specified distance range (a range of 7.0-8.1 m in the embodiment) through the longitudinal position adjustment of the seat S. Specifically, in the embodiment, the front-upward slant angle $\theta$ is set substantially at 10 degrees such that the respective shortest clear-vision distances of all passengers, including the passenger J1 and the passenger J2, who have any body size between the largest body size of the passenger J1 and the smallest body size of the passenger J2 are within the range of 7.0-8.1 m.

In FIG. 1, an area where the shortest clear-vision distances are within the above-described specified distance range is shown by a range between a visual line $\alpha 1$ and another visual line $\alpha 2$. The visual line $\alpha 1$ corresponds to the smallest distance within the specified distance range, and the visual line $\alpha 2$ corresponds to the largest distance within the specified distance range. The visual lines of all passengers, including the passenger J1 and the passenger J2, who have any body size between the largest body size of the passenger J1 and the smallest body size of the passenger J2 can be positioned within the range between the visual line $\alpha 1$ and the visual line $\alpha 2$ by the longitudinal position adjustment of the seat S. That is, the eyes of the largest body-sized passenger J1 are positioned within the range between the visual line $\alpha 1$ and the visual line $\alpha 2$ when the position of the seat S where the passenger J1 is seated is adjusted at the rearmost position. Further, the eyes of the smallest body-sized passenger J2 are positioned within the range between the visual line $\alpha 1$ and the visual line $\alpha 2$ when the position of the seat S where the passenger J2 is seated is adjusted at the foremost position. Herein, if the above-described slant angle $\theta$ is set at about 6 degrees like the conventional structure, it is absolutely impossible without the seat lifter to make the shortest clear-vision distances of all passengers who have any body size between the body size of the passenger J1 and the body size of the passenger J2 be within the specified distance range.

The front-upward slant angle $\theta$ of the slide rail 21 is set at the one that is considerably higher than the conventional one as described above. Accordingly, it is necessary to overcome a large resistant force caused by the weight of the seat S when the seat S is moved forward through a slide operation. Therefore, as schematically shown in FIG. 1, there is provided an assist spring 22 to decrease a force for forward moving the seat S. The assist spring 22 is a coil spring in the embodiment, one end of which is fixed to the base frame 20 and the other end of which is fixed to the seat cushion 10. While the assist spring 22 is a spring for forward biasing the seat cushion 10, i.e., the seat S, a biasing force of the assist spring 22 is set at a magnitude (value) equivalent to a rearward component-of-force of the weight of the seat S which is generated along the angle of the above-described slant angle $\theta$. Herein, the assist spring 22 is not limited to the coil spring but any other biasing means, such as gas spring, is applicable.

Figure 3:
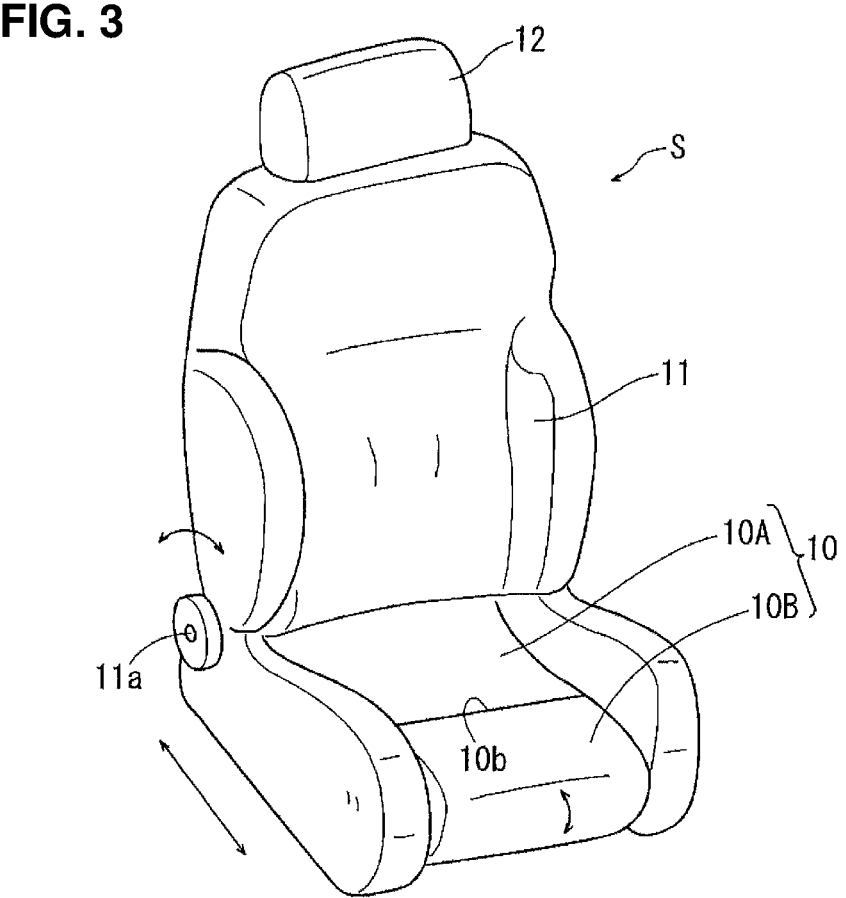
FIG. 3 is a perspective view of an example of a seat equipped with a thigh support portion which has an adjustable swing angle.

In FIG. 3 specifically illustrating the seat S, the seat cushion 10 comprises a rear part 10A and a front part 10B, which are split from each other. An upper-rear end edge (a boundary portion from the rear part 10A) of the front part 10B is denoted by reference character 10b.

The front part 10B constitutes a thigh support portion which is configured to swing (rotate) vertically around its rear portion. A swing (rotational) center of the front part 10B is denoted by reference character 10a in FIG. 1. A swing (rotational) angle adjustment of the front part 10B is a manual type in the embodiment, and its swing (rotational) angle is adjustable with a pitch of 0.5 degrees, for example, and its adjustable swing-angle range is set at 4 degrees or greater (at 5 degrees in the embodiment). Herein, a length of the front part 10B is set at ⅓-½ of an entire longitudinal length of the seat cushion 10, for example. Herein, changing of 1 degree of the swing angle of the front part 10B as the thigh support portion may cause a considerably large swing-angle change due to sensitive feelings of the passenger.

Figure 4:
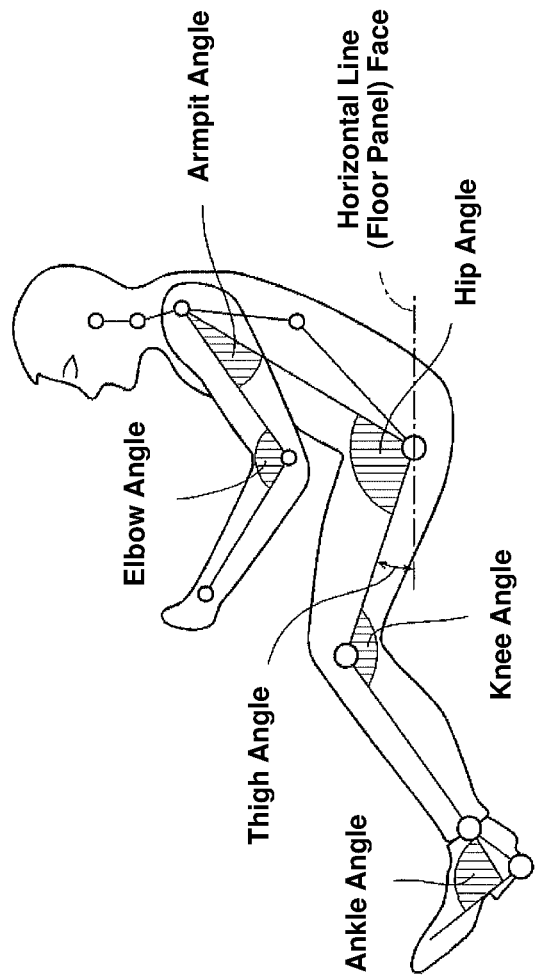
FIG. 4 is a diagram showing a joint angle range which is required for an appropriate driving position.

Next, joint angles of the passenger relating to a driving position will be described referring to FIG. 4. A hip angle, a knee angle, and an ankle angle are shown as the joint angles of a lower half of the body which is positioned below a waist, and these angles are important in a foot operation of an accelerator (pedal), a brake pedal, a clutch pedal, or a footrest, not illustrated respectively. Further, there exist an armpit angle and an elbow angle as preferable joint angles of an upper half of the body. Herein, in order to provide an appropriate driving position, it is necessary to consider all conditions regarding all of the above-described joint angles for a comfortable position, easy operability, and characteristics of each of the joint angles during vehicle traveling. Specifically, such conditions may be that the hip angle can properly resist a speed deceleration (inertia) without using muscular power, the ankle angle can be properly operated only by a pressing-side muscle which does not get tired easily and used for pressing the pedal, and the armpit angle and the elbow angle can properly support the body continuously.

Next, merits (advantages) of the thigh support portion (the swing-angle adjustable front part 10B) provided at the seat cushion 10 will be described referring to FIGS. 5A, 5B.

Figure 5A:
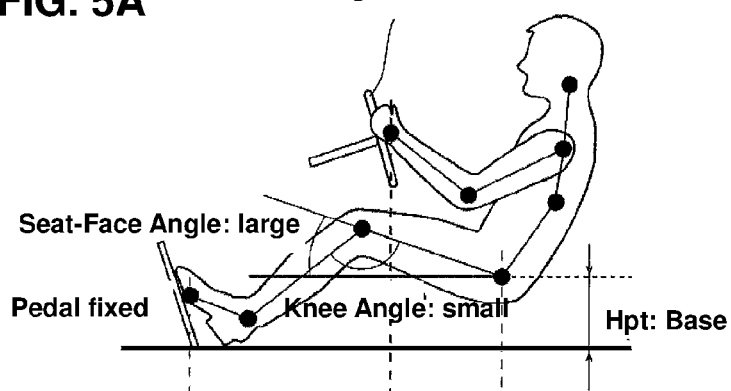
FIGS. 5A and 5B are diagrams explaining merits (advantages) of providing the thigh support portion having the adjustable swing angle.
Figure 5B:
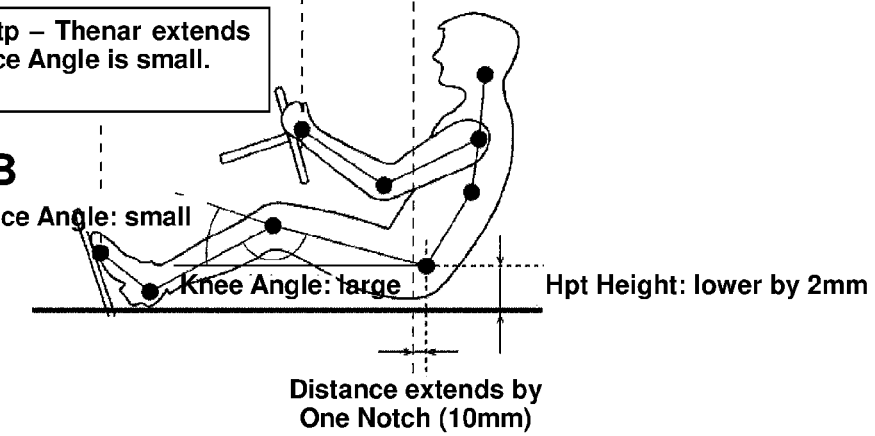

FIG. 5A shows a state in which a driver takes an appropriate driving position, and FIG. 5B shows a state in which the seat is slid by one notch (10 mm in the embodiment) rearward from the state shown in FIG. 5A, taking the appropriate driving position. In a case of the body size of the AM50 standard, in the state shown in FIG. 5B, the hip point goes down (by 2 mm, specifically), the knee's height lowers (by 30 mm, specifically), and the knee angle becomes greater (becomes to 9 degrees, specifically) from the state shown in FIG. 5A. Since the knee is the joint which has originally high change flexibility in adjusting the driving position to the appropriate one, changing of the knee angle may have no problem in ensuring (providing) the appropriate driving position. There is substantially no difference in the degree of ideal of the driving position between the state shown in FIG. 5A and the state shown in FIG. 5B. And, the knee can be properly supported by the thigh support portion according to the difference of the knee angle by changing the swing angle of the thigh support portion in the both cases of FIGS. 5A and 5B. Herein, since there is no positional change of the rear part 10A which determines the height position of the passenger's eyes, there occurs no problem in making the shortest clear-vision distance be within the specified distance range.

Herein, if an angle of a seat face becomes too large, the following improper situations may be generated. Even when an accelerator opening is the one which is used during a normal vehicle traveling, the passenger may feel that a front edge portion of the seat cushion 10 is hard or that this pressed front edge portion causes poor blood flow to the right-side thigh. An accelerator's operation may cause the passenger's heel to go up easily and unstably. The passenger may be required to unreasonably bend the ankle toward the side of a sole when operating the clutch pedal. The passenger may feel uncomfortable with the ankle. The passenger may be enforced to take a position in which legs are opened.

Conversely, if the angle of the seat face becomes too small, the following improper situations may be generated. The back of the knee may open, so the passenger may not have a fit feeling. The knee may become unstable and the heel of the right-side foot may not be fixed, so that the passenger may not operate the accelerator (pedal) easily. A locus of the clutch pedal may not match the passenger's feeling. The passenger may be forced to push the pedal straightly despite the passenger's desire to press the pedal from above. Herein, in a case in which the seat S is slid rearward to support the thigh because the thigh angle is too small when the thigh angle (the seat-face angle) cannot be adjusted, the following improper situations may be generated. The actual joint angle may be out of the appropriate joint-angle range. The position of the steering wheel may become too far, so that the passenger may have tired shoulders. The passenger may feel that the ankle is stretched out when pressing the accelerator (pedal), thereby feeling tired.

Herein, in a case in which the smallest body-sized passenger (AF05, for example), the largest body-side passenger (AM95, for example), and the middle body-sized passenger (AM50, for example) are supposed, for example, when considering the appropriate thigh angle so as to correspond to the seat-face angle, there exists no appropriate seat-face angle that is common among the respective passengers. Since the range of the appropriate thigh angle for the passengers of the smallest body-side passenger through the largest body-sized passenger is about 4 degrees, it is preferable that the swing-angle range of the front part 10B as the thigh support portion be at 4 degrees or greater, and it is further preferable that the swing-angle range of the front part 10B be at 5 degrees or greater when considering cushioning characteristics (easy deformability) of the front part 10B or the passenger's taste.

The present invention should not be limited to the above-described embodiment, and any other modifications or improvements may be applied within the scope of a spirit of the present invention. The steering wheel 7 may be provided with the telescopic mechanism in addition to the tilt mechanism or with the telescopic mechanism only, or may not be provided with both of the tilt mechanism and the telescopic mechanism. The range of the adjustable longitudinal length of the seat S may be set to be shorter or longer than 260 mm of the embodiment. The front-upward slant angle θ of the slide rail 21 can be set at any angle within the range of 9-11 degrees so that the shortest clear-vision distances of all passengers who have any body size between the preset shortest body-sized passenger and the present largest body-sized passenger can be made to be within the range of 9-11 degrees. The transmission may be an automatic transmission. The swing-angle change of the front part 10B as the thigh support portion may be linked with the longitudinal-position change of the seat S (for example, a linkage by using a worm gear and a pinion gear so that the thigh angle becomes larger as the seat S is positioned further forward). Of course, the object of the present invention is not limited to the one described explicitly, but includes anything which has been implicitly inspired as preferable things or merits.

What is claimed is:

1. A seat device of a vehicle, comprising:
a seat comprising a seat cushion and a seatback which is connected to a rear end portion of the seat cushion; and
a slide rail provided to attach the seat to a floor panel such that a position of the seat is longitudinally adjustable within a specified longitudinal range,
wherein said slide rail as a specified front-upward slant angle within a range of 9-11 degrees relative to the floor panel such that said seat slides longitudinally with said specified front-upward slant angle and is adjustable over said specified longitudinal range along the slide rail, a thigh support portion is provided at a front end portion of said seat cushion so as to swing vertically around a rear portion thereof with an adjustable swing-angle range of 4 degrees or greater, and said seat device of the vehicle does not comprise any other lift mechanism for adjusting a height of said seat other than said slide rail.

2. The seat device of the vehicle of claim 1, further comprising an assist spring for operational-force reduction which reduces an operational force of adjusting the position of said seat along said slide rail having the specified front-upward slant angle.

3. The seat device of the vehicle of claim 1, wherein the front-upward slant angle of said slide rail is set substantially at 10 degrees.

4. The seat device of the vehicle of claim 1, wherein the adjustable swing-angle range of said thigh support portion is set substantially at 5 degrees.

5. The seat device of the vehicle of claim 1, wherein the specified longitudinal range of the seat's adjustable position and the front-upward slant angle of said slide rail are set such that a first shortest clear-vision distance between eye points of a driver and a ground intersection point of a line of sight of an AF05 seated in the seat located at a forward position of the side rail is within a preset specified distance range and a second shortest clear-vision distance between eye points of the driver and the ground intersection point to the line of sight of a AM95 seated in the seat located at a rear end position of the slide rail is within said preset specified distance range.

6. The seat device of the vehicle of claim 5, wherein said specified distance range of the first and second shortest clear-vision distance is set at 7.0-8.1 m.

7. The seat device of the vehicle of claim 5, wherein a difference between a largest distance and a smallest distance of said preset specified distance range of the first and second shortest clear-vision distances is set at 1.5 m or less.

8. The seat device of the vehicle of claim 1, wherein a steering wheel of the vehicle is not provided with a telescopic mechanism.

9. A seat device of a vehicle, comprising:
a seat comprising a seat cushion and a seatback which is connected to a rear end portion of the seat cushion; and
a slide rail provided to attach the seat to a floor panel such that a position of the seat is longitudinally adjustable within a specified longitudinal range,
wherein said slide rail has a specified front-upward slant angle within a range of 9-11 degrees relative to the floor panel such that said seat slides longitudinally with said specified front-upward slant angle and is adjustable over said specified longitudinal range along the slide rail.

10. The seat device of the vehicle of claim 9, further comprising an assist spring for operational-force reduction which reduces an operational force of adjusting the position of said seat along said slide rail having the specified front-upward slant angle.

11. The seat device of the vehicle of claim 9, wherein the front-upward slant angle of said slide rail is set substantially at 10 degrees.

12. A seat device of a vehicle, comprising:
a seat comprising a seat cushion and a seatback which is connected to a rear end portion of the seat cushion; and
a slide rail provided to attach the seat to a floor panel such that a position of the seat is longitudinally adjustable within a specified longitudinal range and said slide rail has a specified front-upward slant angle relative to the floor panel such that said seat slides longitudinally with said specified front-upward slant angle and is adjustable over said specified longitudinal range along the slide rail;
wherein the specified longitudinal range of the seat's adjustable position and the front-upward slant angle of said slide rail are set such that a first shortest clear-vision distance between eye points of a driver and a ground intersection point of a line of sight of an AF05 seated in the seat located at a forward position of the side rail is within a preset specified distance range and a second shortest clear-vision distance between eye points of the driver and the ground intersection point to the line of sight of an AM95 seated in the seat located at a rear end position of the slide rail is within said preset specified distance range; and
said seat device of the vehicle does not comprise any other lift mechanism for adjusting a height of said seat other than said slide rail.

13. The seat device of the vehicle of claim 12, further comprising an assist spring for operational-force reduction which reduces an operational force of adjusting the position of said seat along said slide rail having the specified front-upward slant angle.

14. The seat device of the vehicle of claim 12, wherein the front-upward slant angle of said slide rail is set within a range of 9-11 degrees relative to the floor panel.

15. The seat device of the vehicle of claim 14, wherein the front-upward slant angle of said slide rail is set substantially at 10 degrees.

* * * * *